United States Patent Office

3,542,775
Patented Nov. 24, 1970

3,542,775
PROTONATABLE COLOR-FORMING COMPOUNDS
Carl M. Smith, White Bear Lake, Minn., assignor to
Minnesota Mining and Manufacturing Company, St.
Paul, Minn., a corporation of Delaware
No Drawing. Filed June 16, 1969, Ser. No. 833,757
Int. Cl. C07d 27/38
U.S. Cl. 260—240          2 Claims

ABSTRACT OF THE DISCLOSURE

A substantially colorless carbamate derivative of a colored protonatable color progenitor compound, formed by reaction with a phenyl isocyanate and without loss of color-forming capability.

---

This invention relates to protonatable color progenitors useful in the preparation of heat-sensitive copy-sheet materials from which color projection transparencies may be prepared by thermographic copying processes.

Color Precursor No. X–4405, having the structure $$\text{indole-C(CH}_3\text{)}_2\text{-CH=CH-C}_6\text{H}_4\text{-OH}$$

is a deep orange-yellow crystalline compound which on protonation, e.g. by heating with an organic acid, converts to an intense yellow dye. The use of the compound in a heat-sensitive copy-sheet product is described in Berg-Wiese application Ser. No. 590,211 filed Oct. 28, 1966, now U.S. Pat. 3,483,013 granted Dec. 9, 1969.

The carbamate derivative compounds of the present invention are equally adapted to protonation and color formation, and in addition are initially a pale yellow in color so that the copy-sheet remains substantially colorless at background areas and an increase in contrast is obtained in the color projection transparency.

The derivative is prepared by mixing together the color precursor and an appropriate aryl isocyanate in liquid form, initiating the reaction, e.g. by mild heating or by introduction of a catalyst or both, and continuing the reaction to the substantial disappearance of the initial yellowish color. The product is then promptly separated from the liquid, e.g. by dilution with inert liquid, or by cooling, or by filtration or the like, or by a combination of such procedures, so as to avoid undesirable further reaction. The product is recovered in crystalline form and may be washed, recrystallized, or otherwise purified as desired.

One way in which the liquid form may be attained is by utilizing an excess of the liquid aryl isocyanate sufficient to dissolve the solid reactant. Simple warming of the mixture then causes the reaction to proceed, with rather rapid discharge of the initial deep color followed almost immediately by deposition of the pale yellow crystalline product. Further reaction is effectively stopped at that point by rapid cooling or by dilution with cold liquid hydrocarbon.

Another process involves dissolving the two reactants together in an inert vehicle and initiating the reaction by heating and by introduction of a catalyst. Toluene and tin octoate are effective as vehicle and catalyst respectively. After the desired reaction has proceeded to completion, as indicated by the substantial disappearance of the initial color, the mixture is cooled and diluted, e.g. by addition of cold cyclohexane, and the crystalline product is subsequently recovered.

Phenyl isocyanate, $C_6H_5$—$N=C=O$, is a preferred reactant since the resulting compound on protonation produces a color-body of maximum color density. Effective color progenitor compounds have also been prepared using phenyl isocyanates substituted in the ring by alkyl, alkoxy, and halogen radicals. Naphthyl isocyanate is also effective.

Where other color-bodies may be present or formed in the reaction mixture it is sometimes difficult to determine the exact point at which the initial deep orange-yellow color of the progenitor compound is reduced to a minimum, and other means of establishing the desired endpoint may then be found preferable.

The following examples will further illustrate the practice of the invention. Proportions are given in parts by weight unless otherwise indicated.

EXAMPLE 1

One part of "Color Precursor X–4405" compound is mixed with five parts of phenyl isocyanate and the mixture is warmed to initiate the reaction. The compound dissolves rapidly, with simultaneous substantially complete elimination of its orange-yellow color. Pale yellow crystals of the derivative compound begin to deposit almost immediately. The mixture is cooled and filtered. The recovered crystals are washed with hexane and dried. Yield 1.22 parts colorless crystals, M.P. 150–175° C. with decomposition and discoloration. Infra-red analysis indicates elimination of the phenolic hydroxyl radical and introduction of a carbamate linkage.

EXAMPLE 2

Color Precursor X–4405 compound, 60 gm., is mixed into 300 ml. of toluene and the mixture is brought to a boil. A total of 300 ml. of phenyl isocyanate is added and the solution is again brought to boiling and held at that temperature until all of the compound is dissolved. There is then added 1.8 gm. of "T–9" catalyst, a 65% solution of tin octoate in toluene, with an additional 25 ml. of toluene, and boiling is continued for about five minutes until the residual color does not change visibly in one-half to one minute. At this point 300 ml. of cold cyclohexane is added rapidly and with vigorous stirring. A crystalline product precipitates. It is removed by filtration, washed with 100 ml. of cyclohexane and with 500 ml. of hexane to complete elimination of phenyl isocyanate, and dried in vacuum. Yield 76.5 gm.=88% of theoretical. The product melts at 145–170° C. with decomposition and discoloration.

Analysis.—Calc'd for $C_{25}H_{22}N_2O_2$ (percent): C, 78.51; H, 5.80; N, 7.33. Found (percent): C, 78.5; H, 5.60; N, 7.30.

The infra-red curve is identical with that obtained in Example 1.

EXAMPLE 3

To four ml. of p-toluene isocyanate is added 1.31 gm. of "Color Precursor X–4405" compound. The mixture is gently heated. The compound dissolves with some loss of color. One drop of "T–9" catalyst is added with agitation. The color momentarily darkens and then rapidly fades to a pale greenish yellow. The mixture is cooled to room temperature and permitted to stand for one-half hour during which time pale yellow platelets form. Further cooling causes further precipitation. The resulting slurry is transferred to a filter, using one ml. of toluene during the transfer, and the crystals are washed on the filter using 5 ml. of cyclohexane followed by 25 ml. of hexane, with complete removal of isocyanate. The crystals melt at 155.2–155.6° C. with discoloration. Results of an infra-red analysis are consistant with the assigned formula.

Similar preparations are made using methoxyphenyl isocyanate, chlorophenyl isocyanate, and 1-napthyl isocyanate as the second reactant, with recovery of the corresponding derivative in each instance. The structural formula of these several derivatives is represented as

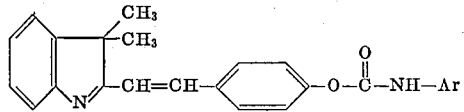

wherein Ar may be a α-naphthyl or

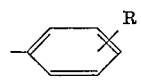

and wherein R is hydrogen, alkyl, alkoxy or halogen.

What is claimed is as follows:

1. A protonatable color progenitor compound having the structural formula

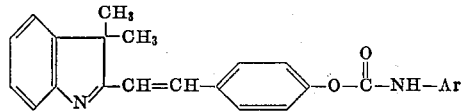

wherein Ar is α-naphthyl or

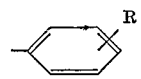

and wherein R is hydrogen, alkyl, alkoxy or halogen.

2. A protonatable color progenitor compound as defined in claim 1 having the structural formula

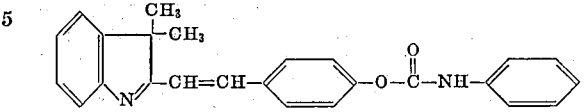

References Cited

UNITED STATES PATENTS 3,346,571  10/1967  Spatz et al. _____ 260—240

OTHER REFERENCES

Beilstein's Handbuch der Organischen Chemie, 4th ed., Band 12, system #1625, p. 343, Von Springer, Berlin, Germany (1929).

Houben-Weyl Methoden der Organischen Chemie, 4th ed., Band VIII, p. 131, Georg Thieme Verlag, Stuttgart, Germany (1952).

JOHN D. RANDOLPH, Primary Examiner

U.S. Cl. X.R.

117—36.2, 138.8